United States Patent [19]

Natsuume

[11] 4,042,407
[45] Aug. 16, 1977

[54] HYDRAULIC COMPOSITION

[75] Inventor: Tadao Natsuume, Yokosuka, Japan

[73] Assignee: Nippon Zeon Co., Ltd., Tokyo, Japan

[21] Appl. No.: 596,150

[22] Filed: July 15, 1975

[30] Foreign Application Priority Data

July 17, 1974 Japan .................................. 49-81870
Mar. 4, 1975 Japan .................................. 50-26197

[51] Int. Cl.$^2$ ................................................ C04B 7/35
[52] U.S. Cl. ........................................ 106/90; 106/97; 106/314
[58] Field of Search ............... 106/90, 97, 98, 314, 106/315; 260/29.6 S

[56] References Cited

U.S. PATENT DOCUMENTS

| | | | |
|---|---|---|---|
| 2,790,724 | 4/1957 | Bergman | 106/90 |
| 3,817,767 | 6/1974 | Bozer et al. | 106/98 |
| 3,923,717 | 12/1975 | Lalk et al. | 106/314 |

*Primary Examiner*—J. Poer
*Attorney, Agent, or Firm*—Sherman & Shalloway

[57] ABSTRACT

A hydraulic composition comprising 100 parts by weight of a hydraulic substance and as a water-reducing admixture 0.01–2.0 parts by weight of a water-soluble polymer, said polymer being selected from the group consisting of a specific water-soluble olefin-ethylenically unsaturated dicarboxylic acid salt copolymer and a specific derivative of said copolymer.

22 Claims, No Drawings

HYDRAULIC COMPOSITION

This invention relates to a hydraulic composition which not only can provide mortar or concrete of good workability by the addition of a relatively small amount of water but also can develop high strength after the mortar or concrete has been cured.

In making mortar or concrete numerous classes of admixtures such as air-entraining admixtures, water-reducing admixtures, accelerating admixtures, retarding admixtures, water-resisting admixtures, frost-resisting admixtures and the like are used. Of these admixtures, the water-reducing admixtures are very important in that they are expected to demonstrate principally the following effects.

1. An increase is had in the workability of the not yet hardened mortar or concrete (at the same slump value, the unit amount of water decreases).
2. As a consequence of a decrease in the unit amount of water, it is possible to achieve an increase in the strength of the cured mortar or concrete. Or, if the strength required is the same, the amount of cement used can be reduced.
3. A permeability-reducing effect is demonstrated.

Conventional hydraulic compositions obtained by mixing hydraulic substances with known water-reducing admixtures such as lignosulfonic acid and its salts, alkylarylsulfonic acids and their salts, water-soluble salts of naphthalene-sulfonic acid-formaldehyde condensate, hydroxycarboxylic acids and their salts, etc., have gained widespread use in many fields. However, these known water-reducing admixtures are not entirely satisfactory in that the desired effects were not obtained by the use of these admixtures in small amounts. On the other hand, their use in excess resulted in the entrainment of an excessive amount of air in the mortar or concrete, the retardation of its hardening or an undesirable decline in the strength of the hardened product.

The object of the present invention is to provide an improved hydraulic composition as a result of having discovered a new water-reducing admixture, an admixture that is free from the aforementioned shortcomings.

It has now been found that the foregoing object can be achieved by using as the water-reducing admixture a water-soluble polymer selected from the group consisting of 1. the water-soluble olefin-ethylenically unsaturated dicarboxylic acid salt copolymers represented by the following structure:

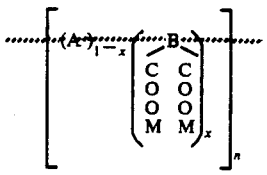

wherein
A is an olefin unit selected from the group consisting of an acyclic olefin having 5 or 6 carbon atoms, a cyclic olefin having 5–10 carbon atoms and derivatives of said cyclic olefin,
B is selected from the group consisting of

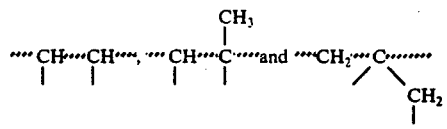

M is selected from the group consisting of an alkali metal atom, an alkaline earth metal atom and ammonium ion,
x is 0.4–0.6, and
n is an integer from 2 to 300; and 2. derivatives of said copolymer wherein M in the copolymer is replaced by an alkyl group having 1–8 carbon atoms in an amount of not more than 30% thereof.

The olefin-ethylenically unsaturated dicarboxylic acid salt copolymer and the derivatives thereof defined in (1) and (2), above, are hereinafter referred to as "O-E salt copolymer" and "O-E salt copolymer alkyl ester derivatives", respectively.

Accordingly, there is provided in accordance with the present invention a novel hydraulic composition comprising a hydraulic substance incorporated with the above new water-reducing admixture.

The term "hydraulic substance", as used herein, denotes in accordance with the usual definition a substance which has the property of hardening when mixed with water as a result of undergoing a hydration reaction. Typical examples of hydraulic substances include portland cement, alumina cement, blast furnace slag and mixtures of quicklime and siliceous sand.

The O-E salt copolymer of this invention demonstrates with extreme conspicuousness the effects of (1), (2) and (3), above, that are required of it as a water-reducing admixture.

Further, in the case of the O-E salt copolymer alkyl ester derivative, which is derived by replacing alkyl groups having 1 to 8 carbon atoms, and preferably 1 to 3 carbon atoms, for a part of the M that are present in a large amount in the O-E salt copolymer defined by the aforementioned formula, the property as a water-reducing admixture is enhanced more than in the case of the O-E salt copolymer. The proportion of replacement of the M that are present in a large amount in the O-E salt copolymer by the alkyl groups (in the hereinafter-given examples this will be designated as the rate of substitution by alkyl groups) amounts to not more than 30%, preferably 5–20%, of the total amount of M.

In the olefin unit A constituting the polymer of this invention:

i. As the acyclic olefins having 5 or 6 carbon atoms, there can be named, for example, n-pentene-1, n-pentene-2, 2-methyl-butene-1, 2-methyl-butene-2, 4-methyl-pentene-1, hexene-1, mixtures thereof and hydrocarbon mixtures containing these olefins such as the $C_5$- acyclic olefin mixtures obtained from spent distillate $C_5$-fraction which remains after extraction of diene compounds, etc. However, when the acyclic olefin used is one which is other than that having 5 or 6 carbon atoms, little or no effects as a water-reducing admixture are demonstrated by the polymer.

ii. As the cyclic olefin having 5 to 10 carbon atoms, there can be named, for example, the cycloalkenes such as cyclopentene, cyclohexene, cycloheptene and cyclooctene, the cycloalkadienes such as cyclopentadiene, dicyclopentadiene and indene, etc.

iii. As derivatives of said cyclic olefins (ii), there can be mentioned, for example, their lower alkyl-substituted derivatives having 1–5 carbon atoms in the alkyl group, their cyano-substituted derivatives and their acetyl-substituted derivatives. Examples include methyl cyclopentene, ethyl cyclopentene, n- or iso-propyl cyclopentene, and the Diels-Alder adducts such as cyclopentadiene with an acyclic olefin having 3–7 carbon atoms, acrylonitrile or vinyl acetate (such as 2-methyl-5-norbornene, 2-ethyl-5-norbornene, 2-cyano-5-norbornene or 2-acetyl-5-norbornene). These cyclic olefines of (i), (ii) and (iii) may also be used as a mixture. A hydrocarbon mixture containing these cyclic olefins may also be used.

Of these olefin units A, preferred are the $C_5$- acyclic olefin, $C_5$–$C_6$ cyclic olefins, dicyclopentadiene and the cyclopentadiene Diels-Alder adducts because of the following reasons: the excellent properties of the resulting O-E salt copolymer when used as a water-reducing admixture, the ease of procuring the starting materials and the ease of preparing the copolymer. For the same reasons, as the B in the unit

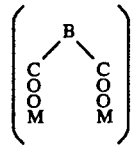

constituting the O-E salt copolymer, preferred is

The method per se for preparing the O-E salt copolymer and the O-E salt copolymer alkyl ester derivatives is not within the scope of this invention. These polymers can be readily produced by applying the known methods. For example, the O-E salt copolymer can be prepared in the following manner.

First, an olefin-ethylenically unsaturated dicarboxylic acid anhydride copolymer is produced by copolymerizing 40–60 mol%, preferably about 50 mol%, of an olefin (the A defined hereinbefore) with 60–40 mol%, preferably about 50 mol%, of an ethylenically unsaturated dicarboxylic acid anhydride (i.e., maleic anhydride, itaconic anhydride or citraconic anhydride) at a temperature of 5°–150° C. in the presence of a radical peroxide, e.g., cumene hydroperoxide, t-butyl hydroperoxide, benzoyl peroxide, acetyl peroxide, methyl ethyl ketone peroxide, the azo compounds such as alpha, alpha-azobisisobutyronitrile and alpha, alpha-azo-2-methyl valeronitrile, acetylcyclohexylsulfonylperoxide or the like and an organic solvent such as acetone, methyl ethyl ketone, benzene, toluene, chloroform, ethyl acetate or the like. Or these copolymers can be obtained by the mass polymerization method. The olefin-ethylenically unsaturated acid anhydride copolymers thus obtained are usually white powders and have a number average molecular weight as measured with a vapor pressure osmometer (methyl ethyl ketone solvent) of 300–50,000, and preferably 500–10,000. As is generally well known, a copolymer between an olefin and said acid anhydride contains both units in a molar ratio of about 1:1.

The water-soluble O-E salt copolymer can then be easily produced by a neutralization reaction between the olefin-ethylenically unsaturated dicarboxylic acid anhydride copolymer obtained as above described and an alkali compound, for example, an aqueous solution of an alkali metal hydroxide, alkaline earth metal hydroxide, ammonium hydroxide, alkali metal carbonate or alkaline earth metal carbonate. Preferred as the aforesaid alkali compound are sodium hydroxide, potassium hydroxide or ammonium hydroxide. Accordingly, thus obtained water-soluble O-E salt copolymer is usually referred to as the water-soluble salt of an olefin-ethylenically unsaturated dicarboxylic acid anhydride copolymer.

As another method of preparing the O-E salt copolymer, there is that consisting of neutralizing a copolymer of an olefin A and an ethylenically unsaturated dicarboxylic acid with an alkali compound.

Next, the O-E salt copolymer alkyl ester derivative is prepared, for example, in the following manner.

An olefin-ethylenically unsaturated dicarboxylic acid anhydride copolymer obtained by the method described above is partially esterified with an alkyl alcohol having 1–12, preferably 1–8, and more preferably 1–3 carbon atoms, preferably in the presence of an organic solvent such as acetone, methyl ethyl ketone or the like, after which the resulting partially esterified copolymer is neutralized as hereinbefore described to obtain the O-E salt copolymer alkyl ester derivative. In addition, for example, a copolymer of an olefin and a monoalkyl ester of an ethylenically unsaturated dicarboxylic acid obtained by radical copolymerization can be neutralized with an alkali compound to obtain the O-E salt copolymer alkyl ester derivative. Alternatively, a copolymer of an olefin and a dialkyl ester of an ethylenically unsaturated dicarboxylic acid obtained by radical copolymerization can be neutralized with an alkali compound to obtain the foregoing derivative.

The magnitude of $n$ in the above formula can be determined from the number average molecular weight (vapor pressure osmotic method, methyl ethyl ketone solution) of the olefin-ethylenically unsaturated dicarboxylic acid anhydride copolymer corresponding to the polymer used in this invention, i.e., the O-E salt copolymer or O-E salt copolymer alkyl ester derivative. While the value of $n$ can be suitably determined in accordance with, say, the mixing conditions of hydraulic composition, it usually is 3–300, and preferably 3–60.

These water-reducing admixtures of this invention, the O-E salt copolymer and O-E salt copolymer alkyl ester derivatives, are effective even when used in smaller amounts than in the case of the conventional admixtures. Moreover, even when these admixtures of this invention are used in relatively large amounts, there is no manifestation of any objectionable side effects such as a decline in strength but, instead, they possess the excellent property of enhancing the effects. Hence, no particular restrictions are imposed in this invention on the proportions in which these admixtures of this invention are admixed with the hydraulic substance. However, for usual purposes, these admixtures are suitably used in an amount of 0.01–2.0 parts by weight, and especially 0.01–1.0 part by weight, per 100 parts by weight of the hydraulic substance.

For enhancement of the effects of the water-reducing admixtures of this invention, such cooperative admixtures as sodium silicate or other water-reducing admixtures may also be added to the composition. Another effect that is had by the addition of such a cooperative admixture is that it becomes possible to reduce the amount incorporated of the invention water-reducing admixture without diminishing its effectiveness, thus being economically an advantage. These cooperative admixtures are suitably used in an amount of 0.01-2.0 parts by weight, and especially 0.02-0.5 parts of weight, per 100 parts by weight of the hydraulic substance.

The hydraulic composition of this invention consisting of the hydraulic substance incorporated with the aforesaid water-reducing admixture excels in its workability not only when it is mixed with water but also when the resulting mortar or concrete is used. In addition, great strength can be imparted to the hardened mortar or concrete. It is not known by what mechanism these effects are brought about in the hydraulic composition of this invention. However, we presume that the dispersibility of the particles of the hydraulic substance in water increases as a result of an interaction between $Ca^{++}$ or $O^{--}$ on the particle surface of the hydraulic substance and the cyclopentanederivative, and that this promotes the hydration reaction.

Needless to say, the hydraulic composition of the invention can contain in conjunction with the foregoing water-reducing admixtures of this invention such other known admixtures as acceleration admixtures, retarding admixtures, water-resisting admixtures, shrinkage-reducing admixtures, colouring admixtures or the like.

The following Examples are given for specifically illustrating the invention. Examples 1-6 and 9-14 illustrate the preparation of the O-E salt copolymer; Examples 7, 8 and 15-18 illustrate the preparation of the O-E salt copolymer alkyl ester derivative; while in Example 19 the effectiveness as a water-reducing admixture of the several copolymers obtained in the Examples 1-18 is evaluated. The percentages and parts used in the Examples are on weight basis. The abbreviation "MW" stands for the number average molecular weight (methyl ethyl ketone solution) as determined with a vapor pressure osmometer.

EXAMPLE 1

A mixture of 98 parts of maleic anhydride, 110 parts of the $C_5$ acyclic olefin mixture shown in Table 1, 4 parts of benzoyl peroxide and 400 parts of benzene was charged to a 1-liter autoclave and reacted by heating with stirring for 8 hours at 70°-75° C. in an atmosphere of nitrogen. After completion of the polymerization reaction, the precipitated copolymer was separated by filtration, collected and dried to obtain 89 parts of a white powdery $C_5$-acyclic olefin-maleic anhydride copolymer (mole ratio substantially 1:1, MW = 4200). 84 parts of this copolymer and 400 parts of a 10% aqueous sodium hydroxide solution were heated at 80°-90° C. with stirring to neutralize the copolymer and obtain an aqueous solution of a $C_5$-acyclic olefin-maleic acid sodium salt copolymer (mole ratio substantially 1:1) [hereinafter referred to as Copolymer (1)].

Table 1

| iso-Pentane | 15.57% |
| n-Pentane | 15.44% |
| 2-Methylbutene-1 | 42.06% |
| n-Pentene-1 | 26.88% |
| Isoprene | 0.05% |

EXAMPLE 2

A mixture consisting of 500 parts of the $C_5$-acyclic olefin mixture of Table 2 and 4 parts of benzoyl peroxide was charged to an autoclave, and the reaction was carried out by adding with stirring at a temperature of 70°-75° C. over a period of 3.5 hours a mixture consisting of 98 parts of maleic anhydride and 350 parts of benzene. The reaction was then continued for a further 7 hours after completion of the addition. After a completion of the reaction, the precipitated copolymer was separated by filtration, collected and dried to obtain 159 parts of a white powdery $C_5$-acyclic olefin-maleic anhydride copolymer (mole ratio substantially 1:1; MW = 4500). The so obtained copolymer was then neutralized in accordance with the procedure described in Example 1 to obtain an aqueous solution of a $C_5$-acyclic olefin-maleic acid sodium salt copolymer (mole ratio substantially 1:1) [hereinafter referred to as Copolymer (2)].

Table 2

| n-Pentane | 41.9% |
| iso-Pentane | 26.2% |
| 3-Methyl-butene-1 | 0.9% |
| Pentene-1 | 6.5% |
| 2-Methyl-butene-1 | 11.5% |
| trans-Pentene-2 | 7.1% |
| cis-Pentene-2 | 2.6% |
| 2-Methyl-butene-2 | 5.1% |

EXAMPLE 3

A reflux condenser-equipped 1-liter separate flask was charged with 98 parts of maleic anhydride, 300 parts of methyl ethyl ketone, 84 parts of hexene-1 and 4 parts of azobisisobutyronitrile, and the reaction was carried out at 65°-70° C. with stirring. After carrying out the reaction for 10 hours, the system was cooled to room temperature, and then the polymer was precipitated by the addition of cold methanol. The precipitate was separated by filtration and dried under reduced pressure to obtain 108 parts of a white powdery hexene-1-maleic anhydride copolymer (mole ratio substantially 1:1; MW = 3800). A mixture of 91 parts of the so obtained copolymer and 400 parts of a 10% aqueous sodium hydroxide solution was agitated at 80°-90° C. to neutralize said copolymer and obtain an aqueous solution of a hexene-1-maleic acid sodium salt copolymer (mole ratio substantially 1:1) [hereinafter referred to as Copolymer (3)].

EXAMPLE 4

Ethylene was introduced into an autoclave containing a mixture comprising 100 parts of maleic anhydride, 4 parts of azobisisobutyronitrile and 700 parts of benzene, until the inner pressure increases up to 13 Kg/cm². Then the reaction was carried out for 7 hours at 70° C. with stirring to obtain 108 parts of a white powdery ethylene-maleic anhydride copolymer (mole ratio substantially 1:1). A mixture of 63 parts of the so obtained copolymer and 400 parts of a 10% aqueous sodium hydroxide solution was treated as in Example 1 to neutralize said polymer and obtain an aqueous solution of an ethylene-maleic acid sodium salt copolymer (mole ratio substantially 1:1) [hereinafter referred to as Copolymer (4)].

EXAMPLE 5

Example 1 was repeated but using butene-1 as the olefin to obtain 67 parts of a white powdery butene-1-maleic anhydride copolymer (mole ratio substantially 1:1; MW = 1800). A mixture of 35.0 parts of the so obtained copolymer and 134 parts of a 10% aqueous sodium hydroxide solution was heated at 80°-90° C.

with stirring to neutralize said copolymer and obtain an aqueous solution of a butene-1-maleic acid sodium salt copolymer (mole ratio substantially 1:1) [hereinafter referred to as Copolymer (5)].

EXAMPLE 6

A mixture of 98 parts of maleic anhydride, 112 parts of octene-1,4 parts azobisisobutyronitrile and 400 parts of toluene was reacted for 8 hours at 70°–75° C. with stirring in an autoclave in an atmosphere of nitrogen. After completion of the reaction, the reaction mixture was cooled and then precipitated from 500 parts of methanol, followed by filtration and drying to yield 140 parts of a white powdery octene-1-maleic anhydride copolymer (mole ratio substantially 1:1; MW = 4300). A mixture of 105 parts of the so obtained copolymer and 400 parts of a 10% aqueous solution of sodium hydroxide was then treated as in Example 1 to obtain an aqueous solution of an octene-1-maleic acid sodium salt copolymer (mole ratio substantially 1:1) [hereinafter referred to as Copolymer (6)].

EXAMPLE 7

Five parts of methyl alcohol was added to 100 parts of the C$_5$-acyclic olefin-maleic anhydride copolymer for Example 1, the intermediate material for the preparation of the Copolymer (1) therein, to which was also added 200 parts of methyl ethyl ketone, following which the partial esterification of said copolymer was carried out by heating the mixture under reflux. After completion of the reaction, the methyl ethyl ketone was distilled off from the reaction mixture followed by drying the resulting polymer. Next, this polymer was neutralized as in Example 1 by the addition of 412 parts of a 10% aqueous solution of sodium hydroxide to obtain an aqueous solution of Copolymer (1) methyl ester derivative [hereinafter referred to as Copolymer (7)]. The rate of substitution by alkyl groups of this Copolymer (7) is 13%.

EXAMPLE 8

Eight parts of ethyl alcohol was added to 100 parts of the hexene-1-maleic anhydride copolymer of Example 3, the intermediate material for the preparation of the Copolymer (3) therein, after which 200 parts of methyl ethyl ketone was also added and the partial esterification of said copolymer was carried out by heating the mixture under reflux. After completion of the reaction, the methyl ethyl ketone was distilled off from the reaction mixture followed by drying the resulting polymer. Next, this polymer was neutralized as in Example 1 by the addition of 370 parts of a 10% aqueous solution of sodium hydroxide to obtain an aqueous solution of Copolymer (3) ethyl ester derivative [hereinafter referred to as Copolymer (8)]. The rate of substitution by alkyl groups of this Copolymer (8) is 16%.

EXAMPLE 9

After mixing 68 grams (1.0 mole) of cyclopentene, 98 grams (1.0 mol) of maleic anhydride, 3 grams of azobisisonitrile and as solvent 150 grams of toluene in a 500-ml autoclave in an atmosphere of nitrogen, the reaction was carried out for 10 hours at 70° C. with stirring. In concomitance with the progress of the polymerization reaction, precipitation of a cyclopentene-maleic anhydride copolymer occurred. The toluene-insoluble copolymer was separated by filtration, collected and dried to obtain 97 grams of a white powdery cyclopentene-maleic anhydride copolymer (mole ratio substantially 1:1; MW = 1420). Next, 16.6 grams of this copolymer and 80 grams of a 10% aqueous sodium hydroxide solution were used, and by treating the mixture as in Example 1 a 23% aqueous solution of cyclopentene-maleic acid sodium salt copolymer (mole ratio substantially 1:1) [hereinafter referred to as Copolymer (9)] was obtained.

EXAMPLE 10

The experiment was operated exactly as in Example 9 but using 82 grams (1.0 mol) of cyclohexene and 4 grams of azobisisobutyronitrile to obtain 37 grams of a cyclohexenemaleic anhydride copolymer (mole ratio substantially 1:1; MW = 630). 18 grams of the so obtained copolymer was then neutralized as in Example 1 to obtain a 24% aqueous solution of a cyclohexene-maleic acid sodium salt copolymer (mole ratio substantially 1:1) [hereinafter referred to as Copolymer (10)].

EXAMPLE 11

A 1-liter glass reactor was charged with 132 grams (1.0 mol) of dicyclopentadiene, 98 grams (1.0 mol) of maleic anhydride, 200 grams of benzene and 3 grams of benzoyl peroxide and, after purging the system with nitrogen, the reaction was carried out by heating the mixture for 6 hours at 70° C. with stirring. In concomitance with the progress of the polymerization reaction, there was precipitated a copolymer of dicyclopentadiene and maleic anhydride. After completion of the reaction, the precipitated polymer was collected by filtration and dried to obtain 49 grams of a white powdery dicyclopentadiene-maleic anhydride copolymer (mole ratio substantially 1:1; MW = 680). 23 grams of this copolymer and 80 grams of a 10% aqueous sodium hydroxide solution were used, and by carrying out the neutralization reaction as in Example 1 a 28% aqueous solution of a dicyclopentadiene-maleic acid sodium salt copolymer (mole ratio substantially 1:1) [hereinafter referred to as Copolymer (11)] was obtained.

EXAMPLE 12

Example 11 was repeated but using 1.0 mole of 2-cyano-5-norbornene instead of 1.0 mol of dicyclopentadiene to obtain 63 grams of a 2-cyano-5-norbornene-maleic anhydride copolymer (mole ratio substantially 1:1; MW = 520).

Using 22 grams of this copolymer and 80 grams of a 10% aqueous sodium hydroxide solution and by operating as in Example 1, a 28% aqueous solution of a 2-cyano-5-norbornene-maleic acid sodium salt copolymer (mole ratio substantially 1:1) [hereinafter referred to as Copolymer (12)] was obtained.

EXAMPLE 13

The experiment was carried out as in Example 11 but using 1.0 mol of 2-acetyl-5-norbornene instead of 1.0 mol of dicyclopentadiene to obtain 76 grams of a 2-acetyl-5-norbornene-maleic anhydride copolymer (mole ratio substantially 1:1; MW = 600).

Next, 24 grams of this copolymer and 80 grams of a 10% aqueous sodium hydroxide solution were used, and by carrying out the treatment as in Example 1 a 29% aqueous solution of a 2-acetyl-5-norbornene-maleic acid sodium salt copolymer (mole ratio substantially 1:1) [hereinafter referred to as Copolymer (13)] was obtained.

EXAMPLE 14

Example 14 was repeated but using 1.0 mol of 2-ethyl-5-norbornene instead of 1.0 mol of dicyclopentadiene to obtain 48 grams of a 2-ethyl-5-norbornene-maleic anhydride copolymer (mole ratio substantially 1:1; MW = 600). Next, 22 grams of this copolymer and 80 grams of a 10% aqueous sodium hydroxide solution were used, and by operating as in Example 1 a 28% aqueous solution of a 2-ethyl-5-norbornene-maleic acid sodium salt copolymer (mole ratio substantially 1:1) [hereinafter referred to as Copolymer (14)] was obtained.

EXAMPLES 15-18

A partial esterification reaction of a copolymer was carried out by heating for 8 hours under reflux a mixture consisting of 100 parts of an olefin-ethylenically unsaturated dicarboxylic anhydride copolymer indicated in Table 3, 200 parts of methyl ethyl ketone and an alcohol of a class and in an amount indicated in said Table 3. After completion of the reaction, the methyl ethyl ketone was distilled off from the reaction mixture, following which the polymer was dried. Next, a 10% aqueous solution of sodium hydroxide was added to the polymer in an amount indicated in Table 3 to carry out the neutralization reaction. Thus were obtained the several aqueous solutions of Copolymer (9) ethyl ester derivative ]hereinafter referred to as Copolymer (15)], Copolymer (10) ethyl ester derivative [hereinafter referred to as Copolymer (16)], Copolymer (11) methyl ester derivative [hereinafter referred to as Copolymer (17)] and Copolymer (12) ethyl ester derivative [hereinafter referred to as Copolymer (18)].

Of the raw materials for the concrete, portland cement was used as the cement; river gravel with a maximum particle diameter of 2.5 mm, as the fine aggregates; and river gravel with a maximum particle diameter of 25 mm, as the coarse aggregate.

In the evaluation, for facilitating the determination of the performance of each copolymer as a water-reducing agent, the amounts of each component of the raw material were so adjusted that the slump value would become about the same. The results obtained are shown in Table 4.

In the test, the slump, amount of air and compressive strength were measured in accordance with the JIS Methods A1101, A1116 and A1108, respectively, and the concrete temperature was held at 22°-25° C.

It is apparent from Table 4 that when the invention copolymers [Copolymers (1)-(3) and (7)-(18)] are used, as compared with the instances where these copolymers are not used as an admixture, there is manifested the same workability with a smaller unit amount of water, there is an increase in the compressive strength, and in the case where the same compressive strength is required, it is possible to decrease the amount of cement used.

It can be further seen that the Copolymer (4) or Copolymer (6), which have been obtained by using as acyclic olefins ethylene or octene-1, which are without the scope of the present invention, do not demonstrate the effects of a water-reducing admixture. Again, it can likewise be seen that the effects as a water-reducing admixture of Copolymer (5) obtained by using butene-1 ($D_4$-acyclic olefin), an olefin without the scope of the present invention, are lower than the cases of the inven- Table 3

| Example No. | Copolymer used | Alcohol used (Parts) | Parts of 10% aqueous solution of sodium hydroxide used | No. of resulting copolymer | Rate of substitution by alkyl groups of resulting copolymer (%) |
|---|---|---|---|---|---|
| 15 | cyclopentene-maleic anhydride copolymer obtained in the preparation of Copolymer (9) | ethyl alcohol 5 | 438 | Copolymer (15) | 9 |
| 16 | cyclohexene-maleic anhydride copolymer obtained in the preparation of Copolymer (10) | ethyl alcohol 8 | 376 | Copolymer (16) | 15.7 |
| 17 | dicyclopentadiene-maleic anhydride copolymer obtained in the preparation of Copolymer (11) | methyl alcohol 5 | 285 | Copolymer (17) | 17.9 |
| 18 | 2-cyano-5-norbornene-maleic anhydride copolymer obtained in the preparation of Copolymer (12) | ethyl alcohol 7 | 308 | Copolymer (18) | 16.5 |

EXAMPLE 19

A concrete test was conducted to determine the properties of the O-E salt copolymers and O-E salt copolymer alkyl ester derivatives obtained in Example 1-18 when used as water-reducing admixtures for concrete.

tion Copolymer (1) of Copolymer (3), which have been obtained by using a $C_5$-acyclic olefin or $C_6$-acyclic olefin. There is only a difference of one carbon atom between the $C_4$-acyclic olefin and the $C_5$-acyclic olefin. However, it is truly surprising that this slight difference brings about a difference in the water-reducing effects of the resulting polymer.

Table 4

| | No. | Amount of copolymer added based on cement (%) | Cement (kg/m³) | Unit amount of water (kg/m³) | Coarse aggregate (kg/m³) | Fine aggregate (kg/m³) | Water to cement ratio (%) | Ratio of fine aggregate to total aggregate (%) | Slump (cm) | Amount of air (%) | Compressive strength after 28 days (kg/cm²) |
|---|---|---|---|---|---|---|---|---|---|---|---|
| | (1) | 0.25 | 300 | 142 | 1186 | 790 | 47.3 | 40 | 7.4 | 2.4 | 430 |
| | (1) | 0.30 | 300 | 138 | 1192 | 794 | 46.0 | 40 | 7.5 | 2.7 | 442 |
| | (2) | 0.25 | 300 | 142 | 1186 | 790 | 47.3 | 40 | 7.2 | 2.1 | 432 |
| | (2) + sodium silicate* | 0.20 + 0.08 | 300 | 138 | 1192 | 794 | 46.0 | 40 | 6.9 | 2.0 | 431 |
| The present invention | (2) + sodium silicate* | 0.10 + 0.04 | 300 | 145 | 1186 | 790 | 48.3 | 40 | 7.2 | 1.7 | 412 |
| | (3) | 0.25 | 300 | 142 | 1186 | 790 | 47.3 | 40 | 6.9 | 2.2 | 432 |
| | (7) | 0.15 | 300 | 142 | 1186 | 790 | 47.3 | 40 | 7.2 | 3.0 | 428 |
| | (8) | 0.15 | 300 | 142 | 1186 | 790 | 47.3 | 40 | 7.5 | 3.7 | 430 |
| | (9) | 0.125 | 300 | 147 | 1178 | 785 | 49.0 | 40 | 7.0 | 1.8 | 418 |
| | (9) | 0.25 | 300 | 141 | 1187 | 791 | 47.0 | 40 | 7.4 | 2.9 | 439 |
| | (9) | 0.50 | 300 | 136 | 1195 | 797 | 45.3 | 40 | 7.1 | 3.3 | 441 |
| | (10) | 0.25 | 300 | 140 | 1189 | 792 | 46.7 | 40 | 6.8 | 3.0 | 442 |
| | (10) | 0.50 | 300 | 135 | 1196 | 798 | 45.0 | 40 | 6.8 | 3.5 | 446 |
| | (11) | 0.25 | 300 | 142 | 1186 | 790 | 47.3 | 40 | 7.3 | 3.8 | 441 |
| | (11) | 0.50 | 300 | 138 | 1192 | 794 | 46.0 | 40 | 7.5 | 4.0 | 463 |
| | (12) | 0.25 | 300 | 140 | 1189 | 792 | 46.7 | 40 | 7.1 | 4.3 | 450 |
| | (13) | 0.25 | 300 | 142 | 1186 | 790 | 47.3 | 40 | 7.5 | 3.4 | 429 |
| | (14) | 0.25 | 300 | 142 | 1186 | 790 | 47.3 | 40 | 7.2 | 3.7 | 437 |
| | (15) | 0.15 | 300 | 141 | 1187 | 791 | 47.0 | 40 | 7.3 | 3.8 | 431 |
| | (16) | 0.15 | 300 | 141 | 1187 | 791 | 47.0 | 40 | 7.0 | 3.0 | 427 |
| | (17) | 0.17 | 300 | 142 | 1186 | 790 | 47.3 | 40 | 6.0 | 3.3 | 425 |
| | (18) | 0.17 | 300 | 140 | 1189 | 792 | 46.7 | 40 | 6.8 | 3.7 | 440 |
| Control | None | — | 300 | 165 | 1121 | 794 | 55.0 | 41.5 | 7.0 | 2.0 | 365 |
| | (4) | 0.25 | 300 | 165 | 1121 | 794 | 55.0 | 41.5 | 7.0 | 2.0 | 350 |
| | (5) | 0.25 | 300 | 152 | 1170 | 779 | 50.7 | 40.0 | 7.1 | 2.2 | 394 |
| | (6) | 0.25 | 300 | 165 | 1121 | 794 | 55.0 | 41.5 | 7.0 | 1.9 | 362 |

*water glass ($Na_2O \cdot 3SiO_2$)

What is claimed is:

1. A hydraulic composition comprising 100 parts by weight of a hydraulic substance and as a water-reducing admixture 0.01 to 2.0 parts by weight of a water-soluble polymer, said polymer being selected from the group consisting of:

1. the water-soluble olefin-ethylenically unsaturated dicarboxylic acid salt copolymers represented by the following structure:

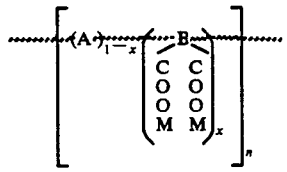

wherein
   A is an olefin unit selected from the group consisting of an acyclic olefin having 5 to 6 carbon atoms, a cyclic olefin having 5-10 carbon atoms and derivatives of said cyclic olefin,
   B is selected from the group consisting of

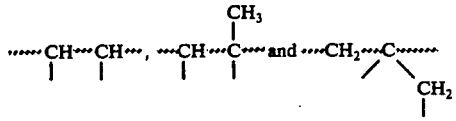

M is selected from the group consisting of an alkali metal atom, an alkaline earth metal atom and ammonium ion,
   $x$ is from 0.4 to 0.6, and
   $n$ is an integer from 2 to 300; and 2. derivatives of said copolymer wherein M in the copolymer is replaced by an alkyl group having 1-8 carbon atoms in an amount of not more than 30% thereof.

2. The composition of claim 1 wherein said water-soluble polymer is an olefin-ethylenically unsaturated dicarboxylic acid salt copolymer.

3. The composition of claim 1 wherein said water-soluble polymer is a derivative of an olefin-ethylenically unsaturated dicarboxylic acid salt copolymer in which M is replaced by an alkyl group having 1-3 carbon atoms in an amount of 5-20% thereof.

4. The composition of claim 1 wherein A is an acyclic olefin having 5 or 6 carbon atoms.

5. The composition of claim 1 wherein A is a cyclic olefin having 5-10 carbon atoms.

6. The composition of claim 1 wherein A is a derivative of a cyclic olefin having 5-10 carbon atoms and said derivative is selected from the group consisting of the lower alkyl-substituted derivatives having 1-5 carbon atoms in the alkyl group, cyano-substituted derivatives and acetyl-substituted derivatives.

7. The composition of claim 1 wherein B is

8. The composition of claim 2 wherein said water-soluble polymer is $C_5$-acyclic olefin-maleic acid salt copolymer.

9. The composition of claim 2 wherein said water-soluble polymer is a hexene-1-maleic acid salt copolymer.

10. The composition of claim 2 wherein said water-soluble polymer is a $C_{5-10}$ cyclic olefin-maleic acid salt copolymer.

11. In a method for reducing the amount of water required for curing a hydraulic composition by adding water-reducing admixture to said hydraulic composition, the improvement comprising adding as the water-reducing admixture, 0.01 to 2.0 parts by weight, per 100 parts by weight of said hydraulic composition, of water-soluble polymer selected from the group consisting of
1. water soluble olefin-ethylenically unsaturated dicarboxylic acid salt copolymers represented by the following structure:

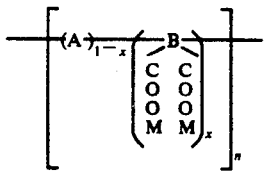

wherein
A is an olefin unit selected from the group consisting of an acyclic olefin having 5 or 6 carbon atoms, a cyclic olefin having 5-10 carbon atoms and derivatives of said cyclic olefin,
B is selected from the group consisting of

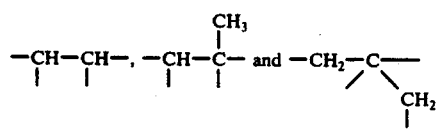

M is selected from the group consisting of an alkali metal atom, an alkaline earth metal atom and ammonium ion,
$x$ is from 0.4 to 0.6, and
$n$ is integer from 2 to 300; and
2. derivatives of said copolymer wherein M in the copolymer is replaced by an alkyl group having 1-8 carbon atoms in an amount of not more than 30% thereof.

12. The method of claim 11 wherein said water-soluble polymer is an olefin-ethylenically unsaturated dicarboxylic acid salt copolymer.

13. The method of claim 11 wherein said water-soluble polymer is a derivative of an olefin-ethylenically unsaturated dicarboxylic acid salt copolymer in which M is replaced by an alkyl group having 1-3 carbon atoms in an amount of 5-20% thereof.

14. The method of claim 11 wherein A is an acyclic olefin having 5 or 6 carbon atoms.

15. The method of claim 11 wherein A is a cyclic olefin having 5-10 carbon atoms.

16. The method of claim 11 wherein A is a derivative of a cyclic olefin having 5-10 carbon atoms and said derivative is selected from the group consisting of the lower alkyl-substituted derivatives having 1-5 carbon atoms in the alkyl group, cyano-substituted derivatives and acetyl-substituted derivatives.

17. The method of claim 11 wherein B is

18. The method of claim 11 wherein said water-soluble polymer is $C_5$-acyclic olefin-maleic acid salt copolymer.

19. The method of claim 11 wherein said water-soluble polymer is a hexane-1-maleic acid salt copolymer.

20. The method of claim 11 wherein said water-soluble polymer is a $C_{5-10}$ cyclic olefin-maleic acid salt copolymer.

21. The composition of claim 1 wherein said water-reducing mixture is present together with sodium silicate.

22. The method of claim 11 wherein said water-reducing admixture is added together with sodium silicate.

* * * * *